July 4, 1933.                     D. C. ROCKOLA                     1,916,234
                                     SCALE
                             Filed Jan. 22, 1931           3 Sheets-Sheet 1

Inventor
David C. Rockola
by Parker & Carter
Attorneys.

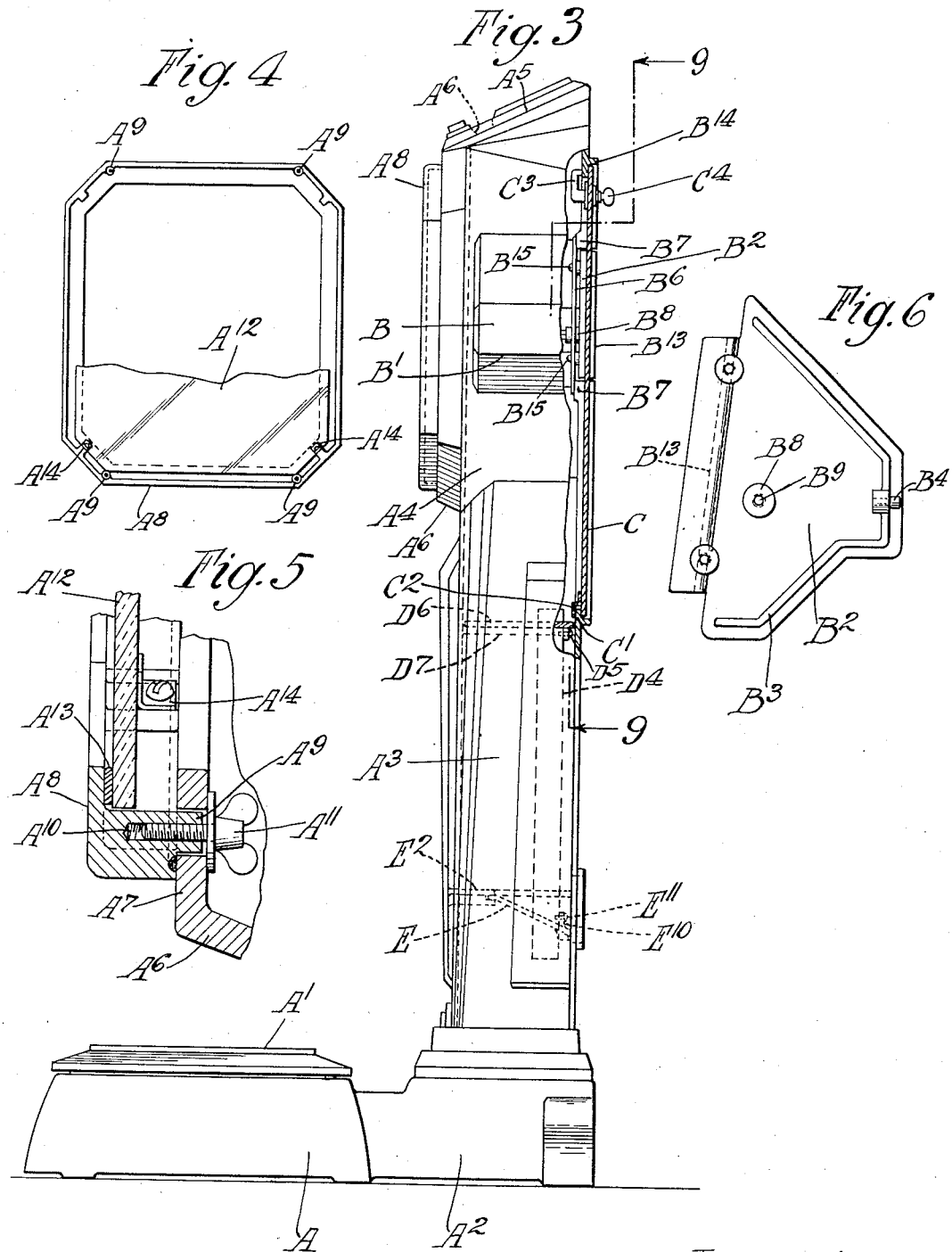

July 4, 1933.  D. C. ROCKOLA  1,916,234
SCALE
Filed Jan. 22, 1931    3 Sheets-Sheet 3
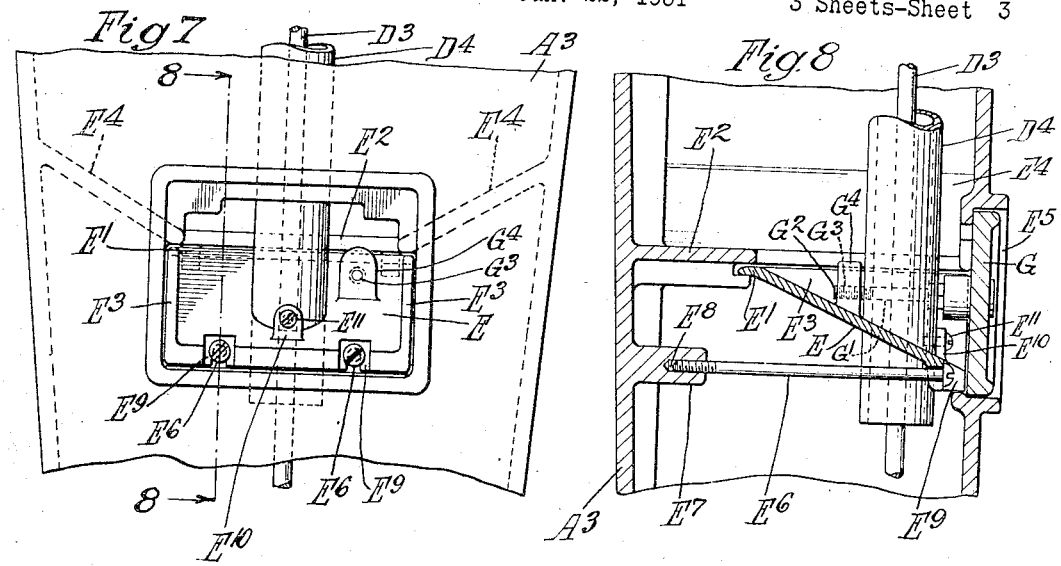
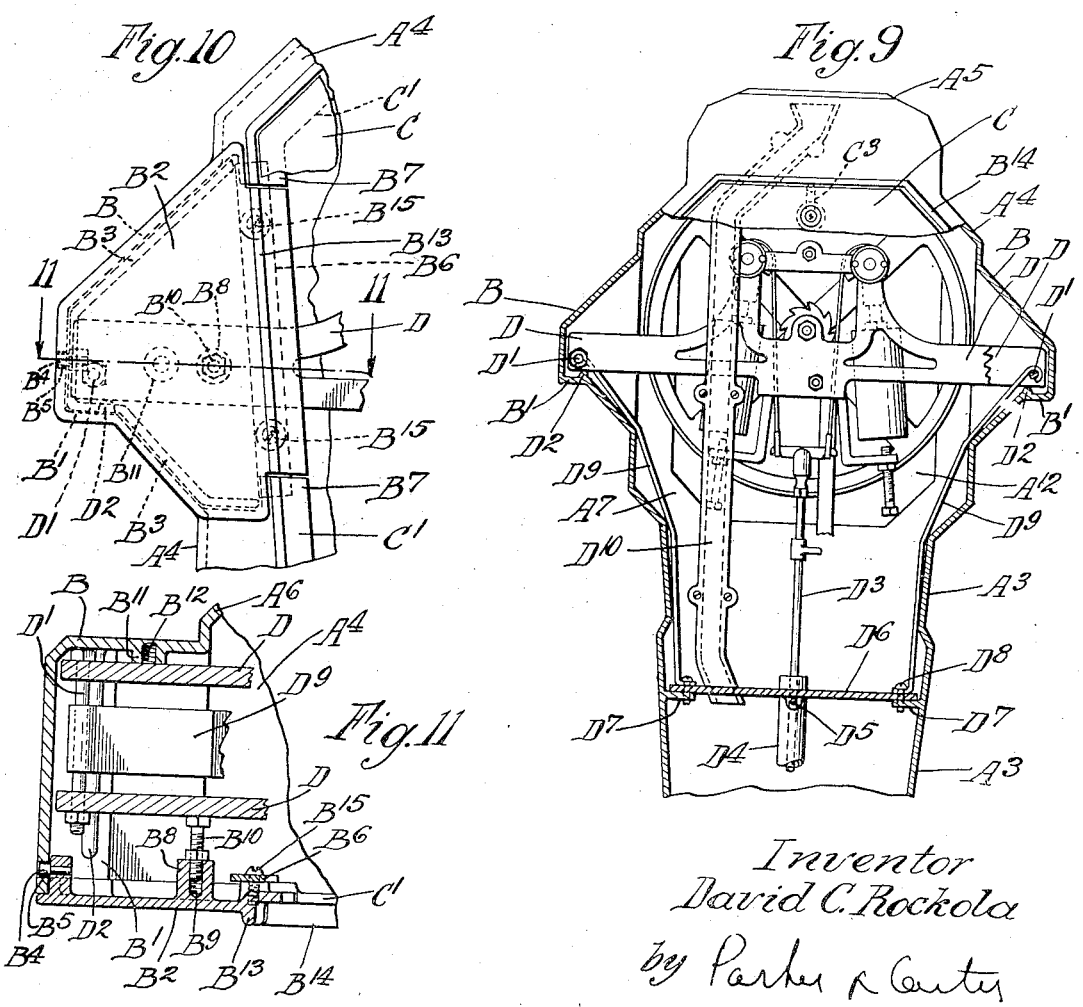
Inventor
David C. Rockola
by Parker & Carter
Attorneys Patented July 4, 1933                                    1,916,234

UNITED STATES PATENT OFFICE

DAVID C. ROCKOLA, OF CHICAGO, ILLINOIS

SCALE

Application filed January 22, 1931. Serial No. 510,340.

My invention relates to an improvement in scales and particularly to an improvement in scale frames, housings, supports or the like. One object is the provision of an improved scale body or housing in which a scale mechanism of substantial width may be supported and enclosed, while maintaining an appearance of small size or slenderness. Another object is the provision of improved means for supporting a scale mechanism within a housing. Another object is the provision of improved means for protecting the coin container. Another object is the provision of improved closure means for permitting access to the interior of the housing and for permitting the insertion into the housing and the removal from the housing of the scale mechanism. Another object is the provision of an improved scale housing having a portion of the scale mechanism exposed. Another object is the provision of improved indicating means for a scale housing. Other objects will appear from time to time in the course of the specification and claims.

I illustrate my invention more or less diagrammatically in the accompanying drawings, wherein—

Figure 1:
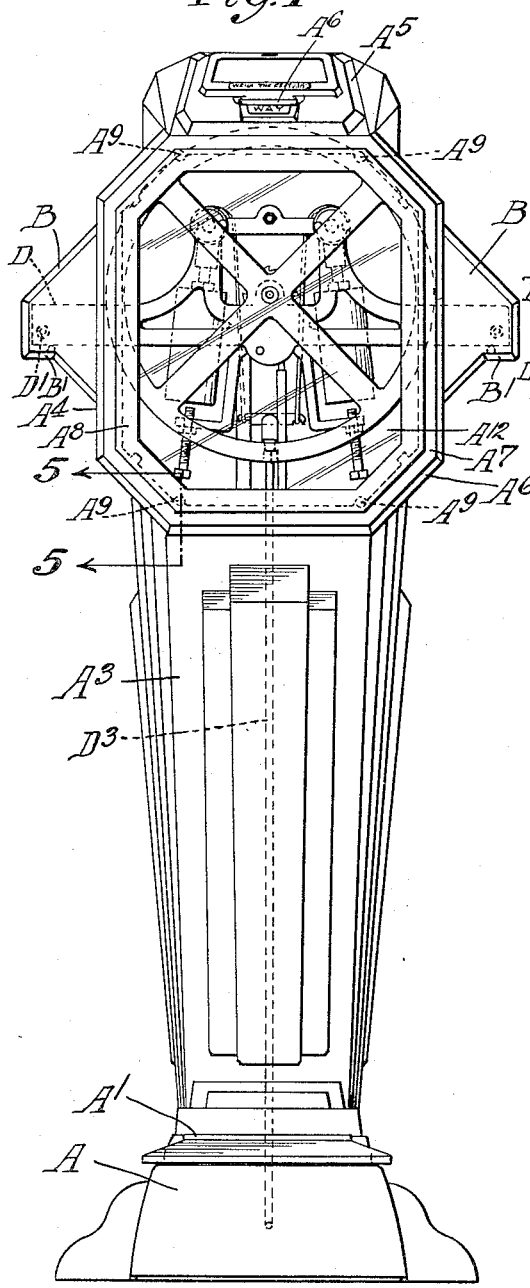
Figure 2:
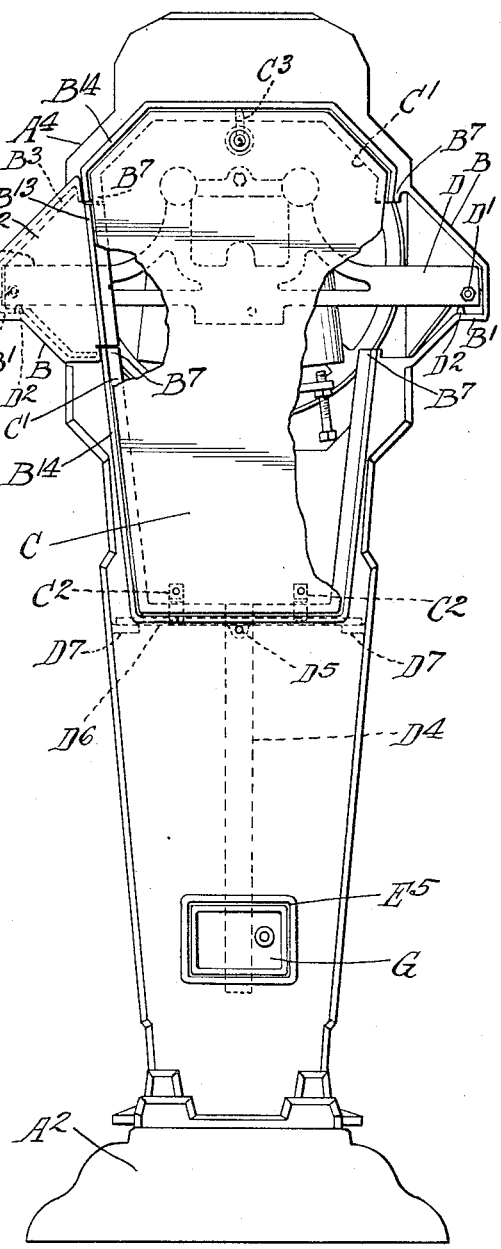

Figure 1 is a front elevation;
Figure 2 is a rear elevation with parts broken away;
Figure 3 is a side elevation with parts broken away;
Figure 4 is a detail view of the front closure;
Figure 5 is a section on the line 5—5 of Figure 1;
Figure 6 is a detail of one of the rear closures;
Figure 7 is a detail of the coin box;
Figure 8 is a section on the line 8—8 of Figure 7;
Figure 9 is a section on the line 9—9 of Figure 3;
Figure 10 is a view illustrating the application of one of the rear closures; and
Figure 11 is a section on the line 11—11 of Figure 10.

Like parts are indicated by like symbols throughout the specification and drawings.

Referring to the drawings, A generally indicates a base portion with which is associated the weighing support $A^1$ upon which the person being weighed stands. The mechanism connecting the platform $A^1$ with the weighing mechanism forms of itself no part of the present invention and therefore is not indicated. The base portion A is rearwardly extended as at $A^2$ to form a pedestal for the upstanding housing generally indicated as $A^3$, in which the scale mechanism, the details of which do not of themselves form part of the present invention, is housed. The housing $A^3$ is shown as upwardly and outwardly flared to connect with the head portion $A^4$. The top of the head portion is upwardly inclined as at $A^5$ and is provided with any suitable aperture or window $A^6$ within which any suitable dial or indicating mechanism may be positioned, to act responsively to the scale mechanism, to show the weight of the customer. Since the details of such indicating mechanism form of themselves no part of the present invention, they are not indicated. The head portion $A^4$ is provided with a forwardly extending bevelled rim $A^6$ bounded by an interior flange $A^7$. Secured to the exterior of the flange $A^7$ is any suitable frame or rim generally indicated as $A^8$. The member $A^8$ is shown as provided with inwardly projecting studs $A^9$ penetrated by screwthreaded apertures $A^{10}$ which may receive for example screws or wing nuts generally indicated as $A^{11}$, whereby the rim or frame $A^8$, is secured in position. As will be seen from Figure 5 the securing means are concealed and inaccessible from the front of the machine. $A^{12}$ indicates a transparent closure, which may be of plate glass, and through which a portion of the weighing mechanism within the head $A^4$ is exposed to the inspection of the user or customer. The pane of glass $A^{12}$ may be positioned against the yielding backing means $A^{13}$, as by the securing brackets $A^{14}$.

It will be observed that the head is formed with lateral ears or extensions B, B, from opposite sides, which are shown as formed with a horizontal terminal shelf portion $B^1$. These extensions are rearwardly open and are adapted to be closed by the supplemental housing closures generally indicated as $B^2$ and illustrated for example in Figures 6 and 10. Each such member $B^2$ conforms in outline to the lateral extension B and is provided with an inwardly extending flange $B^3$. $B^4$ indicates a stud or pin adapted to seat in a corresponding aperture $B^5$ in the outer end wall of the extension B. When the member $B^2$ is positioned with the stud $B^4$ penetrating the aperture $B^5$ and with the flange $B^3$ conforming to the inner faces or edges of the side walls of the member B, the member $B^2$ may be locked in position for example by employment of the screws $B^{15}$ which penetrate a strip $B^6$, the ends of which abut against the inside of the shoulders $B^7$ which form part of the main casting or head. As the heads of the screws $B^5$ are on the inside of the structure, they are not accessible unless and until the rear closure, below described, is removed. The member $B^2$ is also provided with an inwardly projecting boss $B^8$ screwthreadedly apertured as at $B^9$ to receive an adjusting screw or abutment $B^{10}$, the purpose of which will later appear. A corresponding boss $B^{11}$ is provided on the opposed inner face of the lateral extension B of the head or housing, which may, if desired, receive an adjustable abutment, which may for example be like the abutment $B^{10}$. However, in Figure 11 only one such adjusting abutment is illustrated, although another might be inserted in the screwthreaded aperture $B^{12}$ of the boss $B^{11}$, depending upon the width of the parts to be fixed within the members B. It will be also observed, as in Figure 11, that the members $B^2$ are provided with an outwardly extending flange or ridge $B^{13}$, which conforms to and continues a corresponding ridge $B^{14}$ on the main casting which, as shown in Figure 2, defines and surrounds the main closure aperture for the rear of the housing.

Seated in the rear closure and abutting for example against the inwardly extending flange or seat $C^1$, is the closure generally indicated as C. This closure may for example be a flat plate with locking hooks or ears $C^2$, herein shown as positioned along the bottom edge and hooking into or penetrating to the rear of the bottom edge of the aperture in the casting. Any suitable securing means, for example the hook $C^3$, may be provided for holding the top of the closure C. The hook $C^3$ may for example be lock actuated as by the removable key $C^4$.

The scale mechanism is herein shown as mounted within the head $A^4$ of the main casting. While it is thought to be unnecessary to describe this mechanism in detail, since it does not of itself form part of the present invention, it suffices to say that the moving and revolving parts thereof may be supported upon an interior frame which includes the transverse supporting frame elements D, D, connected for example by the transverse bolts $D^1$ to form in effect a single supporting bar or member. This member is supported at each end in one of the lateral extensions B, resting for example upon a bead or ridge $D^2$ formed on or above the horizontal shelf portion $B^1$. The coin mechanism, as shown for example in Figures 1 and 9, is mounted in any suitable fashion upon this transverse support and includes for example the downwardly extending tension rod $D^3$ which extends downwardly through the tube $D^4$ to any suitable connection with the movable platform $A^1$. The tube $D^4$ is apertured to receive a securing screw $D^5$, at its upper end, whereby there is secured to it the horizontal portion or plate $D^6$ which seats upon shelves or ledges $D^7$ within the housing portion $A^3$. The plate $D^6$ is also secured or screwed to these portions $D^7$, as at $D^8$ and the screws $D^8$ also serve to hold the lower ends of the strips $D^9$, whereby the supports D are drawn firmly down against the beads $D^2$, as is shown in detail in Figure 9. $D^{10}$ indicates the coin chute which passes through or about the plate $D^6$, all access to the space below the partition $D^6$ from above being prevented by the securing of the plate $D^6$. In order to prevent the plate $D^6$ from being loosened or unscrewed or opened from above I extend the tube $D^4$ downwardly through the frame portion $A^3$, as shown in detail in Figures 7 and 8. The lower end of the tube passes through an inclined plate or bottom portion E, which serves as the bottom for the coin chamber the top of which is defined by the plate $D^6$, the sides of which are defined by the sides of the housing portion $A^3$. This plate has a lip $E^1$ which penetrates apertures beneath an inwardly extending ledge $E^2$ and also has side walls $E^3$, the upper edges of which abut against the edges of the inclined coin guiding walls or bottom members $E^4$, as shown for example in Figure 7 and 8, whereby all coins will be guided to and upon the plate E for discharge outwardly through the aperture generally indicated as $E^5$. The plate E is held in position, with its outer edge along the lower edge of the aperture $E^5$, by the locking screws $E^6$ the ends of which penetrate the bosses $E^7$ and may be screwthreaded into the screwthreaded apertures $E^8$ thereof. The heads of the screws $E^6$ lie in countersunk apertures $E^9$ aligned with the apertures $E^9$. An ear or lug $E^{10}$ is shown as extending upwardly from the plate E and abutting against the lower end of the tube $D^4$. The screw $E^{11}$ passes therethrough and into the tube $D^4$, whereby the tube is locked in relation to the plate E, thus preventing upward withdrawal of the tube and of the top closure $D^6$. In other words it is only through the aperture $E^5$ that access can be had to the lower end of the tube D⁴, whereby the closure D⁶ can be opened.

G indicates a closure or gate which may be controlled by any suitable locking means. I may for example employ a key controlled screw G¹ the screwthreaded inner end of which G² penetrates the screw-threaded aperture G³ in the lug G⁴ upwardly projecting from the plate E. The operator, employing any suitable key, may rotate the screw G¹ until it is in unlocking position, thereby permitting removal of the closure G and access to the interior of the coin chamber. It is only by opening such closure G that access may be had to the screws E¹¹ and E⁶. Thus even if the upper closure C is pried off the coin chamber is concealed and protected.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing.

I claim:

1. In a weighing device, a housing, a weighing mechanism, and weight indicating means positioned in the upper portion of said housing, a lower portion of said housing being adapted to serve as a coin receptacle, a removable closure for the upper portion of said housing, and a partition adapted to close the upper portion of the coin receptacle, said partition being positioned below said closure, securing means for said partition, positioned within the coin receptacle, and including a longitudinally extending member, a securing connection between an upper portion of said member and said partition, said securing connection being positioned beneath the top of said partition and being inaccessible from above the partition, and means for securing a lower portion of said longitudinally extending element at a point substantially below said partition.

2. In a weighing device, a housing, a weighing mechanism, and weight indicating means positioned in the upper portion of said housing, a lower portion of said housing being adapted to serve as a coin receptacle, a removable closure for the upper portion of said housing, and a partition adapted to close the upper portion of the coin receptacle, said partition being positioned below said closure, securing means for said partition, positioned within the coin receptacle, and including a longitudinally extending member, a securing connection between an upper portion of said member and said partition, said securing connection being positioned beneath the top of said partition and being inaccessible from above the partition, and means for securing a lower portion of said longitudinally extending element at a point substantially below said partition, and within said coin receptacle.

3. In a weighing device, a housing, a weighing mechanism, and weight indicating means positioned in the upper portion of said housing, a lower portion of said housing being adapted to serve as a coin receptacle, a removable closure for the upper portion of said housing, and a partition adapted to close the upper portion of the coin receptacle, said partition being positioned below said closure, an additional closure for said coin receptacle, and securing means for said partition, positioned within the coin receptacle and in general alignment with said closure.

4. In a weighing device, a housing, a weighing mechanism, and weight indicating means positioned in the upper portion of said housing, a lower portion of said housing being adapted to serve as a coin receptacle, a removable closure for the upper portion of said housing, and a partition adapted to close the upper portion of the coin receptacle, said partition being positioned below said closure, and securing means for said partition, positioned within the coin receptacle, including a tube to which said partition is secured at a point inaccessible from above the partition, and means for securing the lower end of said tube against longitudinal movement in relation to the housing.

5. In a weighing device, a housing, a weighing mechanism, and weight indicating means positioned in the upper portion of said housing, a lower portion of said housing being adapted to serve as a coin receptacle, a removable closure for the upper portion of said housing, and a partition adapted to close the upper portion of the coin receptacle, said partition being positioned below said closure, and a bottom plate for said coin receptacle and means for preventing its upward displacement, and securing means for said first mentioned partition, including a longitudinal connection secured to said partition and to said bottom plate.

6. In a scale structure, a housing, a weighing mechanism within the upper portion of said housing, a removable closure for the upper portion of said housing, a coin slot in said housing, a coin guiding passage member positioned within said housing and in communication with said slot, a transverse partition in said housing below said weighing mechanism, the coin guiding passage member terminating at a level below said partition and being adapted to discharge coins thereunder, and securing means for said partition located beneath said partition and inaccessible from the upper portion of said housing, and a second removable closure for said housing positioned at a level lower than said transverse partition, the securing means for said transverse partition being accessible to the lower portion of the housing beneath said partition.

7. In a scale structure, a housing, a weighing mechanism within the upper portion of said housing, a removable closure for the upper portion of said housing, a coin slot in said housing, a coin guiding passage member positioned within said housing and in communication with said slot, a transverse partition in said housing below said weighing mechanism, the coin guiding passage member terminating at a level below said partition and being adapted to discharge coins therebeneath, and securing means for said partition located beneath said partition and inaccessible from the upper portion of said housing, and a second removable closure for said housing positioned at a level lower than said transverse partition, the securing means for said transverse partition being accessible to the lower portion of the housing beneath said partition, said securing means including a tension member extending downwardly from said transverse partition, a securing connection between said tension member and said partition inaccessible from above said partition, and an additional securing connection adjacent the lower portion of said tension member adapted normally to prevent upward movement of said tension member and partition.

8. In a scale structure, a housing, a weighing mechanism within the upper portion of said housing, a removable closure for the upper portion of said housing, a coin slot in said housing, a coin guiding passage member positioned within said housing and in commuication with said slot, a transverse partition in said housing below said weighing mechanism, the coin guiding passage member terminating at a level below said partition and being adapted to discharge coins thereneath, and securing means for said partition located beneath said partition and inaccessible from the upper portion of said housing, and a second removable closure for said housing positioned at a level lower than said transverse partition, the securing means for said transverse partition being accessible to the lower portion of the housing beneath said partition, said securing means including a tension member extending downwardly from said transverse partition, a securing connection between said tension member and said partition inaccessible from above said partition, and an additional securing connection adjacent the lower portion of said tension member adapted normally to prevent upward movement of said tension member and partition, said last mentioned connection including a transverse plate within said housing, means for holding said plate against movement in relation to said housing, and means for holding said tension member against movement in relation to said plate.

9. The structure of claim 8 characterized by the positioning of said transverse plate in general horizontal alignment with the second and lower removable closure.

Signed at Chicago, county of Cook and State of Illinois, this 16th day of January 1931.

DAVID C. ROCKOLA.